United States Patent [19]

Inagaki

[11] Patent Number: 4,830,190

[45] Date of Patent: May 16, 1989

[54] HEATING AND COOLING LUNCH BOX WITH INTAKE AIR OPENING

[76] Inventor: Jitsuo Inagaki, 71, Aza Kamiyashiki, Oaza Itsusiki, Itsusikicho, Hazugun, Aichi, Japan

[21] Appl. No.: 35,926

[22] Filed: Apr. 8, 1987

[30] Foreign Application Priority Data

Apr. 25, 1986 [JP] Japan .................... 61-94606

[51] Int. Cl.$^4$ ............ B65D 90/06; A45C 11/20; A47G 23/04
[52] U.S. Cl. ............... 206/550; 62/457.7; 126/261; 165/61; 206/545; 220/22.3; 220/412; 220/458
[58] Field of Search ........... 206/51, 545, 550, 542, 206/543, 546, 548, 544; 220/3.1, 412, 22.3, 457, 458; 62/457; 126/261, 204; 165/61

[56] References Cited

U.S. PATENT DOCUMENTS

| | | | |
|---|---|---|---|
| 1,979,222 | 10/1934 | Goodwin | 126/261 |
| 2,584,435 | 2/1952 | Doerr | 206/545 X |
| 2,823,902 | 2/1958 | Reynolds | 165/61 X |
| 3,372,690 | 3/1968 | Ruiz | 206/546 X |
| 3,656,650 | 4/1972 | Frater | 220/22.3 |
| 3,908,852 | 9/1975 | Ricobene et al. | 206/550 |
| 4,194,619 | 3/1980 | Schley | 206/546 X |
| 4,604,987 | 8/1986 | Keltner | 126/204 |
| 4,630,671 | 12/1986 | Sherman et al. | 165/61 |

OTHER PUBLICATIONS

Translation of Japanese Utility Model Publication No. 18985/1982.

*Primary Examiner*—Stephen Marcus
*Assistant Examiner*—Bryon Gehman
*Attorney, Agent, or Firm*—Huff & Hanson

[57] ABSTRACT

A heating and cooling lunch box which can preserve meals at a suitable temperature for taste a long time depending the type of meals. The lunch box has an outer container, an inner container for forming a heating and heat insulating container and a cooling container engaged with the outer container, heat source and cooling source for heating and/or cooling the heating and heat insulating container and the cooling container, and a cover for covering the upper surface of the inner container. The heat source is adjacent to the heating and heat insulating container, and an air opening for flowing intake air is perforated in the side wall of the outer container. The air opening communicates with a heat source containing chamber for containing the heating composition which produces heat in the presence of said flowing intake air in the heat source containing chamber.

12 Claims, 3 Drawing Sheets (1)

(2)

HEATING AND COOLING LUNCH BOX WITH INTAKE AIR OPENING

BACKGROUND OF THE INVENTION

This invention relates to a heating and cooling lunch box in which the cooked contents can be thermally insulated at suitable temperature of taste in response to the type of cooking for a long period of time.

When a lunch box is generally heat insulated, a heat insulating vessel called "a lunch jar" is used. Since the insulating vessel has a body of vacuum bottle structure, the vessel has drawbacks such as being very expensive and large shape to be readily collapsible and inconvenient to carry.

In order to eliminate such drawbacks, a lunch box has been known, as disclosed in Japanese Utility Publication No. 18985/1982, in which an upper hollow heat radiator containing high temperature liquid therein and a lower heat radiator are provided to fill lunch in a space formed of both the radiators and a heat insulator is coated on both the radiators.

However, an idea of insulating a lunch box for a long time in both heating and cooking states of opposite properties has not been known. Dishes and hence particularly Japanese dishes have suitable temperatures of taste in response to the types, but the conventional lunch box is heat insulated entirely at the same temperature so as to be eaten at the same temperature. Thus, the content of the lunch box is limited or delicate taste responsive to the types of lunch is obviated at the time of eating the lunch.

When a large quantity of rice boiled in mass production in a production line is filled into lunch boxes and sold, the safety and sanitation of the lunch boxes must be most taken into consideration. However, since there is an anxiety of breeding bacteria in the conventional lunch boxes of simple heat insulation to be used for this purpose, the contents of the lunch boxes are limited from this point of view, and even if the contents are thus selected, there is still a danger of food poisoning.

BRIEF SUMMARY OF THE INVENTION

An object of this invention is to provide a heating and cooling lunch box which can eliminate the abovementioned drawbacks and can manage the temperature such as heating the content, cooling the content and accommodating the content at ambient temperature as well as extremely reducing the danger of food poisoning.

Another object of this invention is to provide a heating and cooling lunch box which can contain the content of food to be tastefully eaten by emitting far infrared rays to the contents during heat insulation.

In order to achieve the above objects, there is provided according to the invention a heating and cooling lunch box comprising an outer container, an inner container for forming a heating and heat insulating container and a cooling container engaged with the outer container, heat source and cooling source for heating and/or cooling the heating and heat insulating container and the cooling container, and a cover for closing the upper surface of the inner container.

The above and other related objects and features of the invention will be apparent from a consideration of the following disclosure found in the accompanying drawings and the novelty thereof.

DETAILED DESCRIPTION OF THE PREFERRED EMBODIMENTS

Embodiments of this invention will be described in detail with reference to the accompanying drawings.

Figure 1:
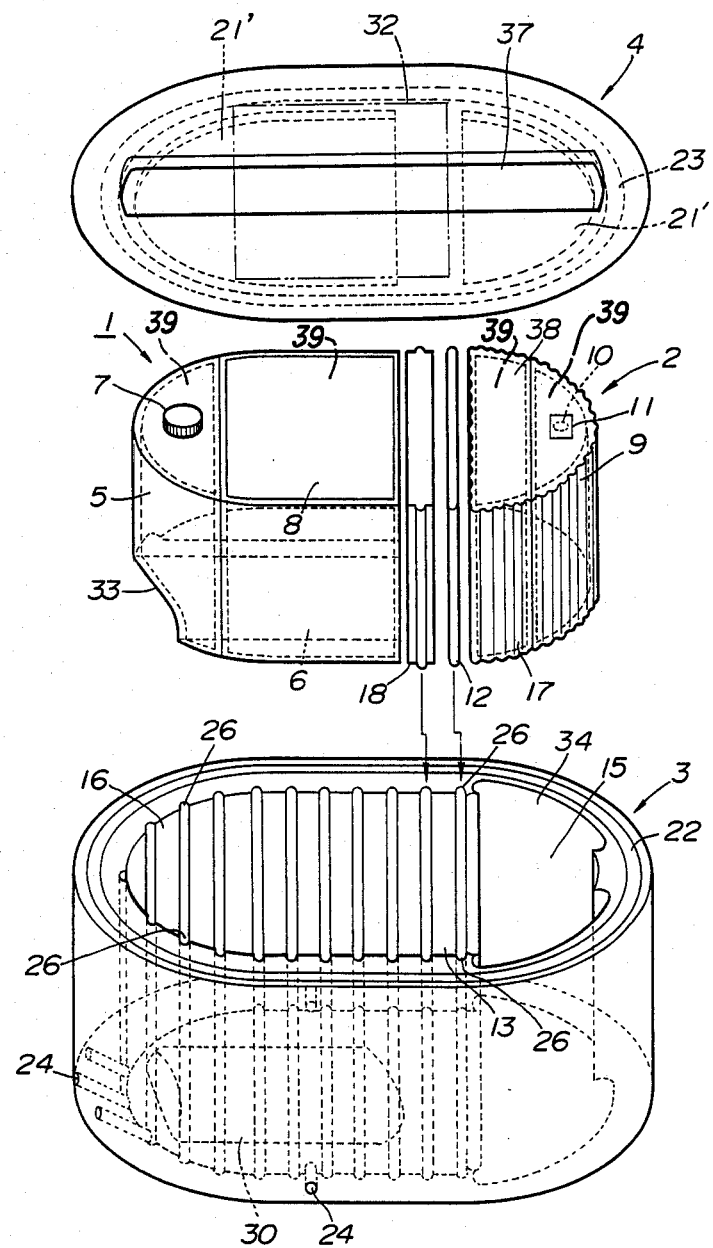
FIG. 1 is an exploded perspective view of an embodiment of a lunch box according to the present invention.
Figure 2:
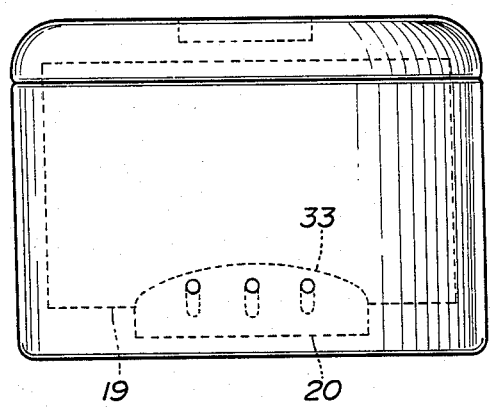
FIG. 2 is a side view of the lunch box.

As shown in FIG. 1, a lunch box of this invention generally comprises a heating and heat insulating container 1 for containing lunch, a cooling container 2, an outer container 3 for engaging the heating and heat insulating container 1 and the cooling container 2, and a cover unit 4 for closing the outer container 3.

The heating and heat insulating container 1 has two vessels comprising a drinking vessel 5 formed with a neck engaged with a cap 7 to drink soup or miso soup therein through the neck by opening the cap 7 and a heating and heat insulating vessel 6 closed by a cover 8 to eat boiled rice and the like by opening the cover 8. The cooling container 2 has two vessels comprising a cold drink vessel 9 and a cold meal vessel 17. A synthetic resin or vinyl tape 11 is thermally sealed in a straw inserting opening 10 at the upper surface of the cold drink vessel 9. A cover 38 is over the upper surface of the cold meal vessel 17 to enable one to eat a salad and/or fruit by opening the cover 38.

The outer container 3 is formed with a cooling chamber 15 and a heating chamber 16 through a partition space 13 and partition walls 12 and 18. The partition space 13 is formed by engaging the partition wall 18 for partitioning the heating chamber 16 with the partition wall 12 for partitioning the cooling chamber 15. The partition space 13 performs a function of buffering between heating and cooling. However, this invention is not limited to the particular embodiment. For example, this partition space 13 may not be provided, but the partition walls may be formed merely of a thick, heat insulating material.

A number of engaging recesses or grooves 26 are formed on the inner peripheral surface of the outer container 3, and the sizes of the heating and cooling chambers 16 and 15 may be freely varied by selecting the engaging positions of the partition walls 12 and 18. The inner container may be selected in response to the selected position of the partition walls. The engaging recesses 26 also perform a function of readily allowing removal the heating container from the outer container 3.

A recess 34 for containing a cooling source is formed on the side wall of the cooling chamber 15. The cooling source to be contained in the cooling source containing chamber 34 includes, for example, a cold insulating bag for containing high molecular gelled compound therein, or a dry ice. The high molecular gelled compound includes, for example, a jelly compound gelled by mixing borax (sodium borate) or boric acid with a emulsion in which polyvinyl acetate is dispersed in polyvinyl alcohol to be contained in the the cold insulating bag as is known per se.

The partition space 13 may be filled with nothing, but may contain, for example, a handy tissue or towel for cleaning fingers and hands, various seasoning or an artificial flower.

Swelled portions 33 extended upwardly in a semi-spherical shape are formed on the bottom 19 of the vessels 5 and 6. A heat source containing portion opened at one end is formed of the swelled portion 33 and a recess 20 formed on the bottom of the outer container. The heat source to be contained in the heat source containing chamber preferably includes, for example, a heating and heat insulating bag for containing a heating composition for heating in the presence of the air. This heating composition includes, for example, a mixture of iron powder, inorganic salt, activated charcoal and water. The heating and heat insulating bag particularly preferably contains a plurality of inner heating and heat insulating bags of different air permeabilities. In other words, when thus constructed, the heating and heat insulating bag having greater air permeability previously heats strongly and the heat and heat insulating bag having less air permeability heats weakly for a long time, thereby maintaining the lunch box at suitable high temperature for a long period of time.

Engaging recesses or grooves 21 and 21' are formed on the lower surface of the cover unit 4, and can be respectively engaged with the cooling container 2 and the heating container 1. When an engaging recess 22 is formed in a ring shape on the upper surface of the outer container 3 and a ring-shaped engaging projection 23 is formed on the lower surface of the cover unit correspondingly to the engaging recess 22 as in this embodiment, the cover unit 4 and the containers can be further rigidly coupled.

Figure 3:
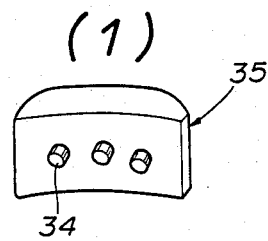
FIG. 3 is a perspective view of an enclosing plate used in the lunch box.
Figure 3:
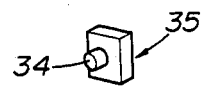

An air opening 24 is perforated in the side wall of the outer container 3 for forming the heat source containing chamber so as to allow air to flow. The air opening 24 is formed with an upward slope directed from the interior toward the exterior. This slope of the opening 24 is formed so as to eliminate, if any, the overflow the small amount of hot water accumulated therein if the lunch box is inclined. When the heating chamber 16 is used as a cooling chamber, the air opening 24 is closed by an enclosing plate 35 which blocks the opening 24 by its projection 34 as shown in FIGS. 3(1) and 3(2).

A recess 37 is formed on the upper surface of the cover unit 4 for containing chopsticks, a spoon and/or a fork therein.

An uneven portion is formed on the outer peripheral surface of the cooling container 2 in contact with the cooling chamber 15 so as to enable ready removal of the cooling container 2 from the outer container 3.

The numbers of the heating and heat insulating containers 1 and the cooling containers 2 and means for clamping the containers may be suitably selected in response to the types of the meals required, and should not be considered to be particularly limited.

In the embodiment described above, the cooling source containing chamber 34 is formed on the side wall of the cooling chamber, and the heat source containing chamber is formed on the bottom of the heating chamber. However, this invention is not limited to the particular embodiment. For example, the sources may be provided on any of the bottom, side and upper surfaces.

Means for generating far infrared rays may be preferably formed by a coating 39 of far infrared ray paint on the inner peripheral surfaces of the heating and heat insulating container 1 and the cooling container 2 in contact with the meals. Thus, the meal can be eaten tastefully even after a long time is elapsed.

The outer container 3, the cover unit 4 to be engaged with the inner container and the partition walls 12, 18 are preferably formed of a heat insulating material such as, for example, a foamable plastic.

Since the heating and cooling lunch box of this invention is constructed as described above, when the inner containers 1, 2, the outer container 3 and the cover unit 4 are formed of plastic materials, the lunch box can be very inexpensively fabricated and preferably adapted for a lunch box to be filled with lunch in a mass production in a production line, then sold and disposed of after eating.

Figure 4:
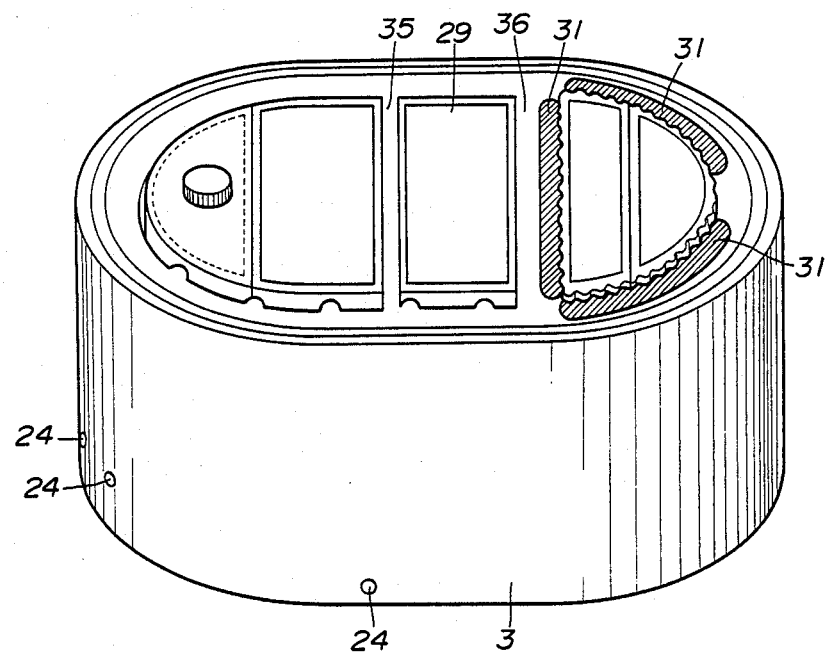
FIG. 4 is a perspective view of another embodiment of a lunch box according to the present invention.

FIG. 4 shows another embodiment of a heating and cooling lunch box according to the present invention. An ambient temperature chamber which is neither heated nor cooled is formed through partition walls 35 and 36 between the heating and heat insulating chamber 16 of an outer container 3 and a cooling chamber 15, and an ambient temperature vessel 29 is contained with the ambient temperature chamber. Numeral 31 designates a heat insulating bag mounted in a cooling source containing chamber 34. As was shown in FIG. 1, when the partition walls 35 and 36 are formed to be movable, the heating and heat insulating chamber, the ambient temperature chamber and the cooling chamber can be formed at desired ratio. Far infrared ray generating means may be preferably provided on the inner peripheral surface of the ambient temperature vessel 29.

When the heating and cooling lunch box is constructed as in this embodiment, the contents of the lunch box can be held at three different temperatures. Thus, a number of types of meals may be preserved at suitable temperatures of taste in response to the types of the meals, thereby pleasing a delicate taste in response to the meals.

Figure 5:
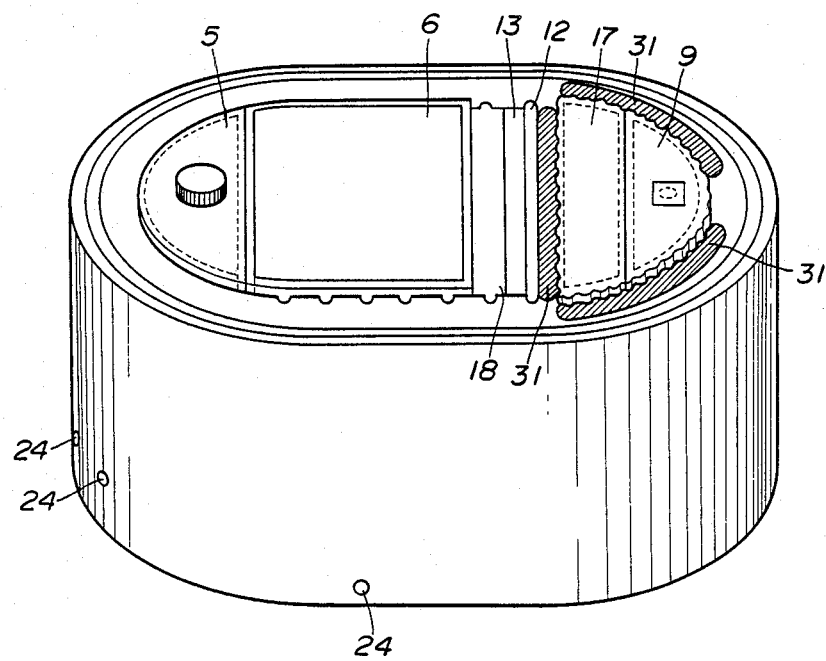
FIG. 5 is a perspective view showing the used state of the lunch box of the invention.

FIG. 5 shows an example of the use of the lunch box of FIG. 1 according to this invention. In this example, the heating and heat insulating vessel 5 contains soup or Japanese soup, the heating and heat insulating vessel 6 contains boiled mixed rice, the cooling vessel 9 contains a drink, the cooling vessel 17 contains salad and/or fruit, and the partition space 13 contains an artificial flower. The heat source uses a heating and heat insulating bag 30 containing heating composition for heating in the presence of air, and the cooling source uses a cold insulating bag 31 containing high molecular gelled compound therein and cooled in advance. Thus, the boiled mixed rice is preserved warmly and the salad is preserved coldly for approximately 10 hours after fabrication. Since the generated steam is absorbed to the upper surface of the mixed rice, a napkin is preferably coated on the mixed rice. Reference numeral 32 in FIG. 1 denotes a pamphlet to be attached which can a lunch box to be sold, which the pamphlet describing the contents in terms of of Calorie, food, cooking and/or health of the lunch to allow a purchaser to obtain knowledge as to health by reading the pamphlet.

In the case where the contents to be filled in the lunch box include food such as Japanese sushi, the heating and heat insulating vessel may be preferably formed in small size and the cooling vessel may be preferably formed in large size. In this instance, the sushi is, for example, contained in one cooling vessel, congealed food is contained in the other cooling vessel, and hot tea is preferably contained in one heating and heat insulating vessel.

According to the present invention as described above, the contents of the lunch box can be simultaneously preserved in heated, cooled and ambient temperature states. Thus, the meals can be preserved by heating, cooling and holding at ambient temperature in response to the suitable temperatures of the tastes of the meals to thereby provide a beautiful and delicately tasteful lunch by maintaining the delicate taste of the meals and also preserving the state of the meals such that bacteria tend not to be bred by heating and cooling in response to the meals. Therefore, the lunch box of the invention can significantly reduce danger of food poisoning. In addition, since the lunch box of this invention can be manufactured very inexpensively, the lunch box of the invention is very adapted as the disposable lunch box to be used and sold by filling lunch as prepared mass production in a production line.

What is claimed is:

1. A disposable heating and cooling lunch box comprising an outer container of foamed plastic material, a plastic inner container for forming a heating and heat insulating container and a cooling container, said inner container within and separably engaged with the outer container, a heat source comprising a heating composition and a cooling source for heating and/or cooling the heating and heat insulating container and the cooling container, said heat source being adjacent to said heating and heat insulating container, and a cover for closing the upper surface of the inner container, an air opening for flowing intake air being perforated in the side wall of said outer container and communicating with a heat source containing chamber for containing the heating composition which produces heat in the presence of said flowing intake air in said heat source containing chamber.

2. The heating and cooling lunch box according to claim 1, wherein said outer container is formed of a heating chamber and a cooling chamber partitioned through a partition space, said inner container is formed of a heating and heat insulating vessel engaged with said heating chamber and a cooling vessel engaged with said cooling chamber.

3. The heating and cooling lunch box according to claim 1, further comprising an ambient temperature chamber formed between said heating and heat insulating chamber and said cooling chamber and containing an ambient temperature vessel.

4. The heating and cooling lunch box according to claim 1, wherein far infrared ray paint is coated on the inner peripheral surface of said heating and heat insulating container.

5. The heating and cooling lunch box according to claim 1, wherein far infrared ray paint is coated on the inner peripheral surface of said cooling container.

6. The heating and cooling lunch box according to claim 5, wherein far infrared ray paint is coated on the inner peripheral surface of said heating and heat insulating container.

7. The heating and cooling lunch box according to claim 1, wherein a swelled portion is formed upwardly on the bottom of said heating and heat insulating container.

8. The heating and cooling lunch box according to claim 1, wherein a number of engaging recesses for engaging a partition wall are formed on the inner peripheral surface of said outer container.

9. The heating and cooling lunch box according to claim 1, wherein a recess for containing a cooling source is formed on the side wall of said cooling chamber.

10. The heating and cooling lunch box according to claim 1, wherein said outer container is formed of a heating chamber and a cooling chamber partitioned through an inner partition wall, said inner container is formed of a heating and heat insulating vessel engaged with said heating chamber and a cooling vessel engaged with said cooling chamber.

11. The heating and cooling lunch box according to claim 1, wherein the heating composition for heating in the presence of air is a mixture of iron powder, inorganic salt, activated charcoal and water.

12. The heating and cooling lunch box according to claim 1, wherein the heating composition comprises a plurality of inner heating and heat insulating bags having different air permeabilities.

* * * * *